Feb. 9, 1960 L. E. FROSLIE 2,924,124
SPEED RESPONSIVE GEAR SHIFT BLOCKER
Filed Oct. 24, 1955 2 Sheets-Sheet 1
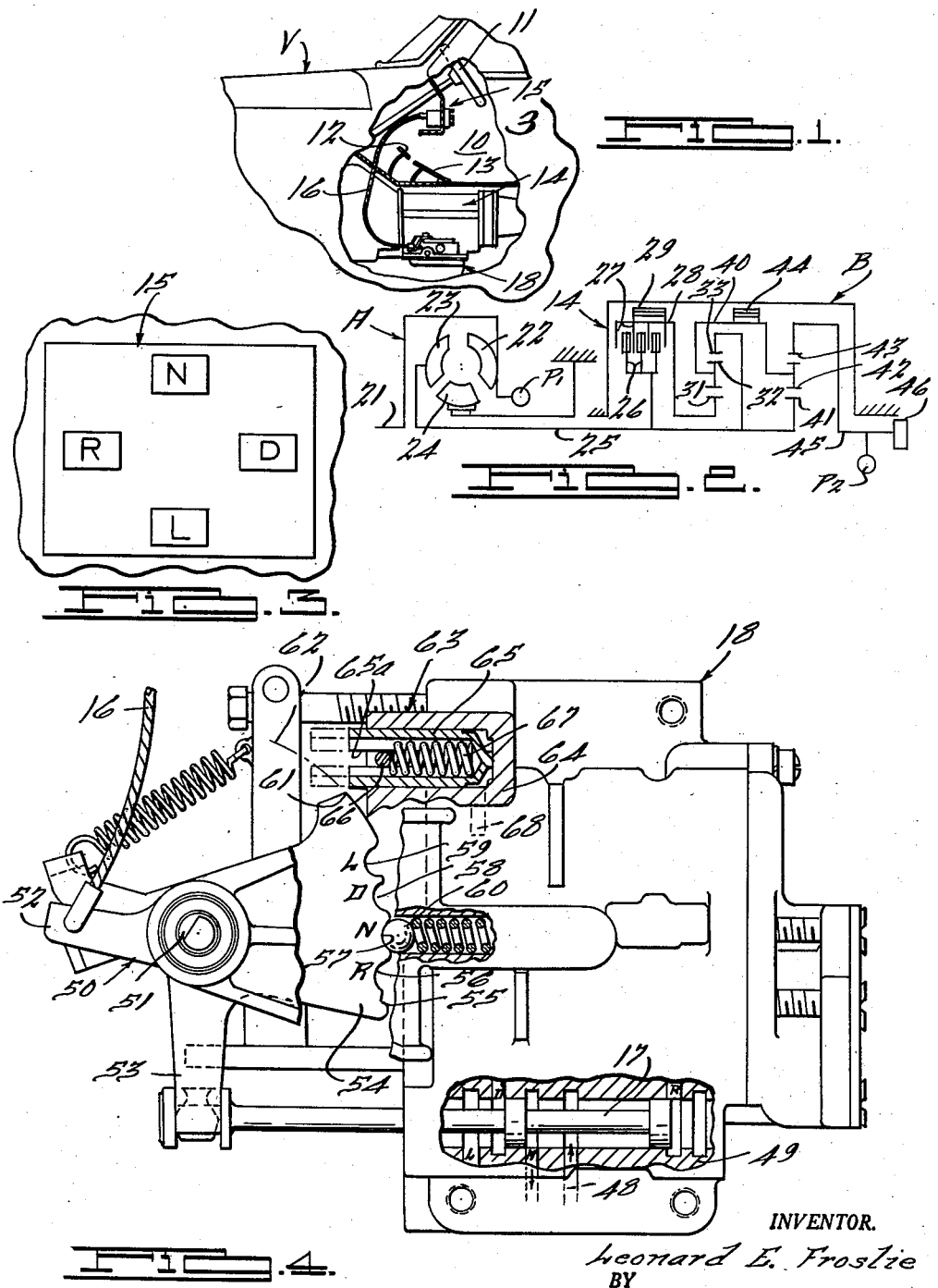
INVENTOR.
Leonard E. Froslie
BY
Harness and Harris
ATTORNEYS

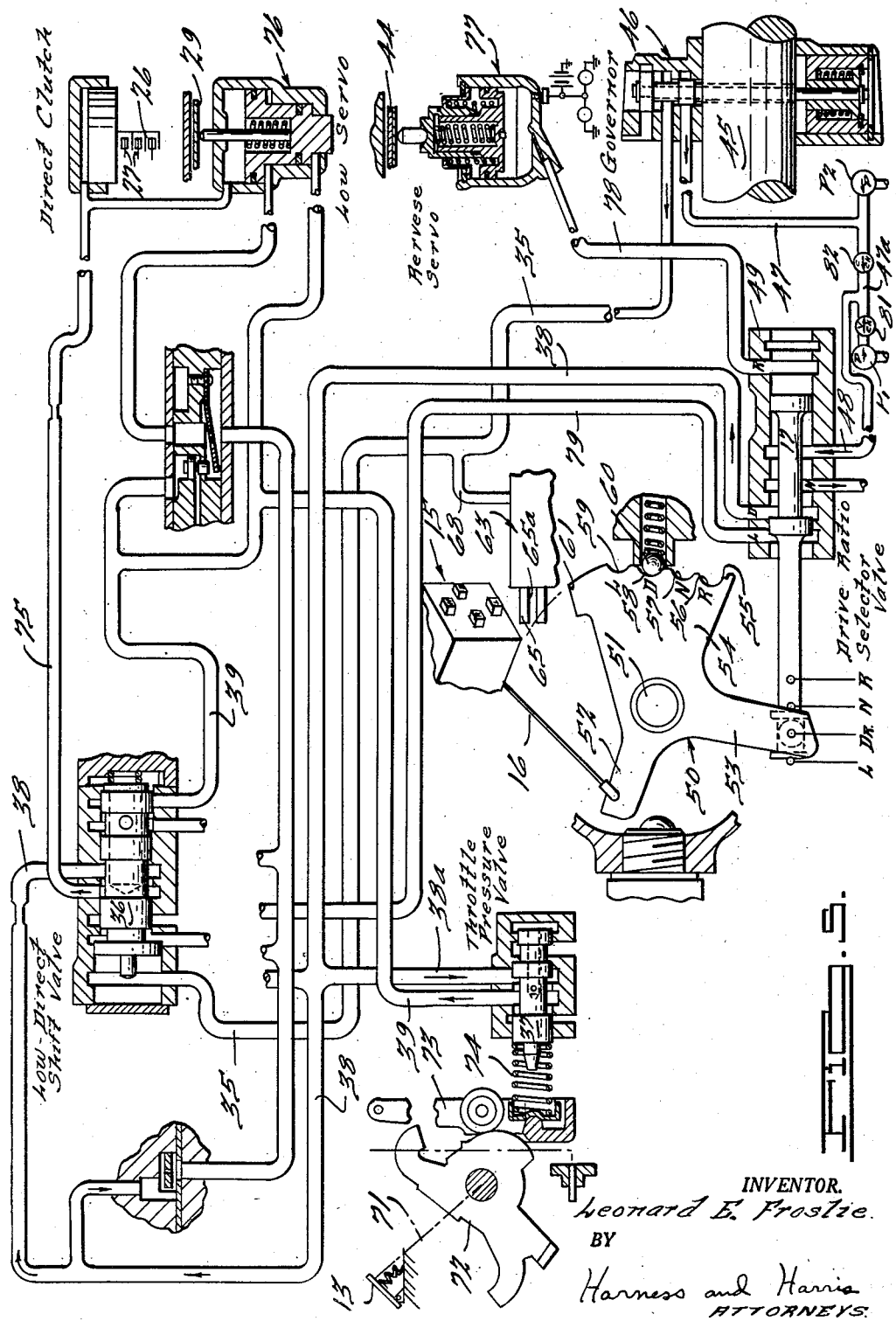

2,924,124
Patented Feb. 9, 1960

2,924,124

SPEED RESPONSIVE GEAR SHIFT BLOCKER

Leonard E. Froslie, Detroit, Mich., assignor to Chrysler Corporation, Highland Park, Mich., a corporation of Delaware Application October 24, 1955, Serial No. 542,125

5 Claims. (Cl. 74—754)

This invention relates to a transmission gear shifting mechanism and particularly to a vehicle speed responsive means to prevent either accidental or intentional shifting into certain drive ratios when the vehicle speed is above a certain predetermined value.

It is a primary object of this invention to provide automatically operable means to prevent the shift from a forward drive ratio to a reverse drive ratio in a motor vehicle transmission when the forward speed of the vehicle is above a predetermined value.

It is another object of this invention to provide a vehicle speed responsive blocker means that is automatically ejected into the path of portions of the drive ratio shifting mechanism, whenever the vehicle forward speed is above a predetermined value, so that it is impossible to operate the drive ratio shifting mechanism in a manner to cause a shift from a forward drive ratio to a reverse drive ratio.

It is still another object of this invention to provide a speed responsive, hydraulic pressure operated blocker means to prevent shifts from a forward drive ratio into a reverse drive ratio when the vehicle forward speed is above a certain predetermined value.

It is still another object of this invention to provide a pressure fluid operated, vehicle speed responsive mechanism to control speed ratio selection.

It is still another object of this invention to provide a vehicle speed responsive gear shifting control that is particularly adapted for non-gated gear shifting mechanisms.

Other objects and advantages of this invention will become readily apparent from a reading of the following description and a consideration of the related drawings wherein:

Fig. 1 is a fragmentary side elevational view of a portion of a motor vehicle having this invention applied thereto, parts being broken away and shown in section for the sake of clarity;

Fig. 2 is a schematic drawing of the power transmission unit utilized in the vehicle shown in Fig. 1;

Fig. 3 is an enlarged elevational view of the push button speed ratio drive selector mechanism used with the power transmission unit shown in Figs. 1 and 2, this view being taken in the direction of the arrow 3 of Fig. 1;

Fig. 4 is an enlarged elevational view of the transmission control valve body used with the transmission shown in Figs. 1 and 2, this view having certain parts thereof broken away and shown in section; and Fig. 5 is a diagrammatic view of the hydraulically operated control system for the power transmission unit shown in Figs. 1 and 2, and showing the application of this invention thereto.

Fig. 1 of the drawings shows a portion of a motor vehicle V that includes the driver's compartment 10. Located in the driver's compartment 10 are the usual vehicle controls such as the steering wheel 11, the brake pedal 12, and the accelerator pedal 13. This vehicle V has an automatic transmission 14 of the type specifically disclosed in the U.S. patent application of Jeremy T. Ball, Serial No. 477,870 filed December 27, 1954. This power transmission unit 14 is shown diagrammatically in Figs. 2 and 5 and is generally described hereafter. The selection of the various speed ratio drives to be transmitted by the transmission unit 14 is accomplished by driver operation of the push button transmission gear selector control mechanism 15. This specific gear selector mechanism is shown and described in detail in the U.S. patent application of Alan G. Loofbourrow et al., Serial No. 530,528 filed August 25, 1955. The push button gear selector mechanism 15 is arranged to actuate the Bowden cable 16 that is connected to the gear ratio or drive ratio selector valve 17 (see Figs. 4 and 5) of the transmission control valve body 18.

Before describing the details of this invention it may be advantageous to point out a few of the reasons for a control mechanism of the type herein disclosed and claimed. There is a present trend to have vehicle drivers effect drive ratio selection by the operation of push button ratio selector controls. This is such an easy, simple way in which to operate a transmission that operators are apt to try to operate the push button controls purely by touch or feel rather than by first visually selecting the push button to be operated and thereafter operating the selected push button. It is thought to be obvious that if, while the vehicle is traveling forwardly at a substantial speed, the operator decides to shift to a different forward drive ratio and in the attempt to make this change in forward speed ratio drive the operator accidentally or otherwise operates a reverse drive push button, the consequences can be rather serious. Not only is it possible that the transmission or parts associated therewith may be damaged by such a change in speed ratio drive but in addition the vehicle will undoubtedly lurch or even get out of the operator's control. If such should occur the vehicle passengers can be thrown against damaging objects within the vehicle or the vehicle could crash into other vehicles or objects that would cause serious harm to the persons as well as the property involved.

From Fig. 3 it is thought to be obvious that the push button drive ratio selector mechanism 15 provides four drive ratio conditions, namely, Neutral, Drive, Low and Reverse. These various ratios may be obtained by respectively depressing the push buttons marked N, D, L and R. Depression of the various push buttons will actuate the cable 16 to varying degrees and the motion is transmitted by the cable 16 to the drive ratio selector valve 17 so as to set the valve 17 in one or the other of its various positions corresponding to Neutral, Drive, Low or Reverse.

The transmission 14 that embodies this invention is shown diagrammatically in Fig. 2 and comprises a torque converter A that receives drive from the vehicle engine (not shown) and transmits it to the planetary gear box B that is arranged rearwardly of the converter A. Engine torque from engine crankshaft 21 is transmitted to the converter impeller member 22 which transmits engine torque to the turbine member 23. By virtue of the operation of the converter stator member 24 the engine torque can be multiplied by the converter in certain speed ranges. The torque from the turbine member 23 is transmitted to the gear box B by the transmission input shaft 25. An engine driven oil pump $P_1$ is shown connected to impeller 22. This pump $P_1$ provides a pressurized "line" pressure whenever the engine is operating.

Transmission input shaft 25 mounts a set of clutch plates 26 that are selectively engageable with another set of clutch plates 27. Clutch plates 27 are drivingly connected to a rotatable driven member 28 that is arranged to be selectively anchored against rotation by a brake band 29. Drum member 28 has drivingly connected thereto the sun gear 31 of the forwardly located planetary gear set of gear box B. Sun gear 31 meshes with planet pinion gearing 32 that is rotatably supported on a drum-like carrier member 40. Plant pinion gearing 32 is also meshingly engaged with an annulus gear 33 that is drivingly connected to the gear box input shaft 25.

Planet pinion carrier 40 also rotatably supports a second set of planet pinion gearing 42. The planet pinion gearing 42 of the rearwardly located planetary gear set of gear box B is meshingly engaged with a sun gear 41 that is drivingly connected to the input shaft 25. Pinion gearing 42 is also meshingly engaged with an annulus gear 43 that is drivingly connected with transmission output shaft 45. A second brake band 44 is adapted to be engaged with the rotatable pinion gear carrier 40 to selectively anchor carrier 40 against rotation. Transmission output shaft 45 has drivingly connected thereto a pump $P_2$ and an output shaft speed responsive governor 46. Pump $P_2$ will supply pressurized fluid whenever the shaft 45 is rotating forwardly. Governor 46 is of the type shown in detail in Fig. 5. This governor is clearly described in U.S. Patent 2,697,363 to William L. Sheppard.

With the described transmission a Neutral or no-drive condition will exist when the direct drive clutch 26, 27 is disengaged and the brake bands 29 and 44 are released, that is, disengaged from their associated drums 28 and 40 respectively. When clutch 26, 27 is disengaged, the brake band 29 applied to drum 28 and brake band 44 released, then the two planetary gear sets will be compounded and a Low speed ratio forward underdrive will be transmitted from transmission input shaft 25 to transmission output shaft 45. This low speed ratio drive can be automatically converted into a forward direct drive by the engagement of clutch 26, 27 and release of brake band 29 while brake band 44 remains released. The control system shown diagrammatically in Fig. 5 effects the operation of the several brake bands 29, 44 and the clutch 26, 27 to accomplish the automatic upshifts and downshifts in speed ratio drive in this transmission. This specific transmission control system is completely described in Jeremy T. Ball application, Serial No. 477,870 filed December 27, 1954 and is not considered to require any further explanation except what is set forth hereafter with respect to its cooperation with the reverse drive blocker mechanism embodying this invention.

Reverse drive is obtained in this transmission by the application of brake band 44 to drum 40 while brake band 29 and clutch 26, 27 are both released.

From Figs. 4 and 5 it is thought to be obvious that the depression of one or the other of the push buttons N, D, L or R will cause the cable 16 to rotate the pivotally mounted lever plate 50 about its pivot shaft 51 a predetermined amount. The lever leg 52 of lever plate 50 has the cable 16 connected thereto while the lever leg 53 of lever plate 50 is connected to the drive ratio selector valve 17. Rotation of the lever plate 50 by depression of one of the pushbuttons N, D, L or R will cause reciprocation of the selector valve 17 to such a position that "line" pressure fluid from the pump supplied "line" pressure supply conduit 48 will be directed into one or the other of the outlet ports N, D, L or R of the drive ratio selector valve body 49. Admission of pressurized "line" pressure fluid to one or the other of the valve body outlet ports N, D, L or R will activate the particular drive ratio that is designated by the letters N, D, L or R.

From Fig. 5 it will be noted that the engine driven pump $P_1$ and the output shaft driven pump $P_2$ each feed the supply conduit 47 with what is called "line" pressure fluid. "Line" pressure fluid is of a substantially constant pressure (90 p.s.i.) in practically all engine and vehicle speed ranges. Branch conduit 48 that feeds the drive ratio selector valve body 49 with "line" pressure derives its pressure fluid supply from the main supply conduit 47a. Supply conduit 47 also feeds the hydraulic governor 46 with a constant intensity pressure fluid supply. The action of the governor 46 is to discharge a variable intensity, vehicle speed responsive, pressurized fluid to the discharge conduit 35. The pressure of the fluid discharged to conduit 35 is directly responsive to the speed of the output shaft 45 because the control action of the governor valve is based on centrifugal action of shaft 45. This output shaft speed responsive pressure fluid in conduit 35, denoted "governor" pressure, is essentially used to provide a speed responsive control force to be applied to the Low-Direct shift valve 36. Low-Direct shift valve 36 also has a pressurized fluid applied thereto that opposes the action of the speed responsive "governor" and this other pressure fluid is denoted "throttle" pressure. The "throttle" pressure results from the action of the accelerator pedal 13 in actuating the throttle pressure control valve 37. The constant intensity "line" pressure from conduit 38a, that is applied to valve 37, will be modified by a reducing valve action of accelerator actuated valve 37 to provide a reduced intensity, "throttle" pressure fluid supply in the discharge conduit 39. Conduit 39 is connected to the Low-Direct shift valve 36 so that it can apply its force to the valve 36 in opposition to the effect of the "governor" pressure applied to valve 36 from conduit 35. The accelerator 13 is connected by linkage means 71 to a cam plate 72 so as to effect rotation of plate 72 by accelerator actuation. Cam plate 72 engages a pivotally mounted follower 73 and effects movement thereof that is transmitted by means of the spring 74 to the throttle pressure control valve 37. As the Low-Direct shift valve 36 is automatically shifted by the opposed "governor" and "throttle" pressures, the "line" pressure in supply conduit 38 is alternately supplied to and drained from the conduit 75 that is connected to the direct drive clutch 26, 27 and the Low servo 76. This essentially provides for the automatic upshifts and downshifts between Low and Direct.

From Fig. 5 it is thought to be obvious that depression of push button R will rotate lever plate 50 counter-clockwise to the maximum degree possible so that the drive ratio selector valve 17 will apply the "line" pressure from supply conduit 48 to the conduit 78 that feeds the Reverse servo 77. This applies the brake band 44 and provides Reverse drive through the transmisison 14. At this time "line" pressure is cut off from the drive conduit 38 and the Low conduit 79 so neither of the forward drive ratios or the controls associated therewith are activated.

The foregoing description is a brief explanation of the manner of operation of the specifically disclosed transmission to which the after-described invention is applied. It should be recognized that this invention can be applied to any transmission and it is not restricted to use with the specifically disclosed transmission.

From Figs. 4 and 5 it will be noted that the lever plate 50 is free to be rotated about its pivot pin 51 by depression of one or the other of the push buttons N, D, L, or R. Depression of each of the push buttons N, D, L, or R, rotates the lever plate 50 a different amount so that the plate connected valve 17 will be positioned in different positions to select the different speed ratio drives and neutral. The lever plate 50 is formed with a segment portion 54 that has its peripheral edge 55 notched to provide four (4) detent receiving notches that insure proper location of the drive ratio selector valve 17 in each of its several drive ratio activating positions. The detent notches 56—59, that correspond to the shift valve positions R, N, D and L respectively, are engaged by a spring pressed, ball-type detent plunger 60 to anchor the plate 50 in its several selected positions. The upper end 61 of the segment portion 54 of lever plate 50 is arranged to swing along the arcuate path denoted 62 as the several push buttons N, D, L and R are depressed. To prevent the shift of the transmission into the Reverse drive ratio when the vehicle forward speed is above a predetermined safe shifting speed, such as 12 miles per hour, there is provided a speed responsive shift blocker means that is generally designated by the reference numeral 63.

Blocker mechanism 63 comprises a cup-shaped cylinder 64 in which is reciprocably mounted a plunger-type blocker 65. Blocker 65 is also of cup-shaped configuration. Cylinder 64 has an anchor pin 66 extending diametrically across it to provide a seat for a compression spring 67. The pin 66 passes through longitudinally extending slots 65a in opposed wall portions of the plunger 65 so that the plunger 65 may be ejected from the cylinder 64 when there is a sufficient pressure in the closed end of the cylinder 64 to overcome the force exerted on the plunger 65 by the compression spring 67. Connected to the closed end of the cylinder 64 is a pressure fluid supply conduit 68. Conduit 68 is connected to the "governor" pressure supply conduit 35 (see Fig. 5). Thus it will be seen that a pressure fluid generated force is applied to the closed end of the plunger type blocker 65 to eject the blocker 65 from the cylinder 64. Because "governor" pressure is used as the ejecting force, the ejection of the blocker 65 is responsive to the speed of the output shaft 45 and consequently the vehicle speed. In the blocker construction disclosed the spring 67 is of such a strength that the vehicle speed must be approximately 12 miles per hour before the resistance of spring 67 will be overcome and the blocker 65 ejected to the blocking position shown by the broken lines in Fig. 4. Obviously the spring 67 can be varied so that blocker ejection can be achieved at substantially any desired vehicle speed.

From a consideration of Fig. 4 it will be noted that whenever the vehicle speed is such that "governor" pressure causes ejection of the blocker 65 to its extended, broken-line, position then it is impossible to rotate the lever plate counterclockwise from its shown Neutral position to the Reverse drive position wherein ball detent 60 would seat in the detent notch 56 on the edge of the lever plate 50. Accordingly, the blocker mechanism 63 provides means that will automatically prevent a shift from either of the forward drive ratios Low or Drive or from the Neutral position into the Reverse drive activating position whenever the vehicle forward speed is above some relatively low predetermined value. If the vehicle speed in forward drive is above the predetermined blocker ejecting speed then the subsequent attempted depression of the Reverse drive push button R will be prevented by the engagement of the portion 61 of lever plate 50 with the ejected portions of the blocker plunger 65 that are shown in broken lines in Fig. 4. As the vehicle speed is reduced below the predetermined blocker ejecting speed the blocker 65 will be retracted by the spring 67 and then a shift into Reverse drive may be made even though the vehicle may be moving forwardly at a reduced speed. This is advantageous for in rocking a car to drive out of a rut or the like it is quite helpful to be able to quickly shift between Low and Reverse while the vehicle has some slight motion in either a forward or a reverse direction. From consideration of Figs. 4 and 5 it will be obvious that the Reverse drive blocker mechanism 63 has no effect whatever on shifts between either one of the forward drive ratios, Low or Drive, or between either of the forward drive ratios and the Neutral condition of the transmission. This is because these shifts never move the lever plate 50 in a counterclockwise direction beyond that shown in Fig. 4. It is only when you try to accomplish a Reverse drive that the lever plate must be moved counterclockwise from the Neutral position shown in Fig. 4 and then it is possible to have interference between the lever plate edge portion 61 and the blocker plunger 65 if the forward vehicle speed is above the critical value.

It should be noted that the blocker means 63 is operable whenever the vehicle is moving forwardly for then the output shaft 45 that drives pump $P_2$ will supply "line" pressure to the governor 46 so that there is a "governor" pressure available to actuate the blocker plunger 65. However, when the vehicle is traveling rearwardly rather than forwardly then the blocker means 63 would not be operable if it were connected to a transmission as herein disclosed for the pump $P_2$ would not pump reversely but would act as a suction pump and "line" pressure could not be supplied to the governor supply conduit 47. Accordingly there could be no "governor" pressure delivered to conduits 35, 68 that feed the interior of cylinder 64. From Fig. 5 it is thought to be clear that the engine driven pump $P_1$ does not supply "line" pressure to conduit 47 for valves 81 and 82 are each one-way check valves for the pumps $P_1$ and P respectively.

It is interesting to note that if, while traveling forwardly at a speed above that required for ejection of blocker 65, a shift to Reverse drive is attempted by depressing the pushbutton R, that the pushbutton mechanism 15 will merely shift the transmission into Neutral. When the vehicle forward speed drops below the predetermined critical speed for a shift into Reverse drive then the reverse pushbutton R is depressed again and the shift valve 17 will then be positioned in its Reverse drive position and Reverse drive will be obtained. This feature is quite advantageous because the obtaining of the Neutral or no-drive condition in the transmission immediately comes to the attention of the vehicle operator and he will then repeat the depression of pushbutton R to obtain Reverse drive provided the forward speed is below the predetermined critical speed for obtaining such a shift. Another point that should be mentioned is that the disclosed safety mechanism 63, for preventing shift into Reverse drive when the vehicle is traveling forwardly above a predetermined speed, does not prevent or effect manually or automatically operated shifts between the several Forward drive ratios or into or out of Neutral.

I claim:

1. In a vehicle multispeed power transmission that provides a plurality of forward drive ratios and a reverse drive ratio, a pressure fluid operated control system for said transmission including a shiftable drive ratio selector valve movable to different positions to selectively activate the forward and reverse drive ratios, a rotatable lever plate connected to said selector valve and arranged to apply valve shifting forces thereto, a driver operated linkage means connected to said lever plate to effect rotation thereof, detent means to anchor said lever plate in the several drive ratio activating positions, and means responsive to the forward drive vehicle speed engageable with said rotatable lever plate to block rotation thereof to a reverse drive activating position, said last-mentioned means comprising a source of pressure fluid having a variable pressure responsive to the forward vehicle speed, and a shiftable blocker member connected to and operable by said vehicle speed responsive pressure fluid and arranged to be engaged with said lever plate to prevent rotation thereof to a reverse drive activating position when the vehicle forward speed is above a predetermined value, said blocker member being arranged to permit rotation of said lever plate to all drive ratio positions other than reverse drive at all vehicle speeds.

2. In a push button control operated motor vehicle power transmission that provides forward, neutral and reverse drive ratios, a pressure fluid operated control system for said transmission including a shiftable drive ratio selector valve movable to different positions to selectively activate the several forward, neutral and reverse drive ratios, a shiftable lever plate connected to said shift valve and operable to effect shift thereof, linkage means connected between the lever plate and the transmission push button control to transmit motion therebetween adapted to move the shift valve to its several drive ratio activating positions, detent means to anchor the shift valve in the several drive ratio activating positions, a source of pressure fluid responsive to the forward speed of the vehicle, a cylinder connected to said source of pressurized fluid, and a piston-type blocker reciprocably mounted in said cylinder for movement by the pressurized fluid therein, said blocker being arranged to have portions thereof moved into blocking engagement with said lever plate to prevent movement thereof to a reverse drive activating position when the forward vehicle speed is above a pre-determined value while permitting activation of neutral and forward drive at any forward vehicle speed.

3. In a motor vehicle transmission having non-gated operating means for driver selection of forward, neutral and reverse drive ratios, a pressure fluid operated control system for said transmssion including a shiftable drive ratio selector mechansm including a valve movable to different positions to selectively activate the several forward, neutral and reverse drive ratios, a shiftable lever connected to said shift valve and operable to effect shift thereof, linkage means connected between the lever and the transmission operating means to transmit motion therebetween adapted to move the shift valve to its several drive ratio activating positions, detent means to anchor the shift valve in the several drive ratio activating positions, a source of pressure fluid responsive to the forward speed of the vehicle, a cylinder connected to said source of pressurized fluid, and a piston-type blocker reciprocably mounted in said cylinder for movement by the pressurized fluid therein, said blocker being arranged to have portions thereof engageable with portions of said mechanism and movable into a position blocking shift of the shift valve to a reverse drive activating position whenever the forward vehicle speed is above a predetermined value but permitting shift of said valve to the other drive ratio activating positions at all forward vehicle speeds.

4. In a motor vehicle transmission having push button operating means for driver selection of a plurality of forward drive ratios and a reverse drive ratio, a pressure fluid operated control system for said transmission including a shiftable drive ratio selector mechanism including a valve movable to different positions to selectively activate the several forward and reverse drive ratios, a shiftable lever connected to said shift valve and operable to effect shift thereof, linkage means connected between the lever and the transmission operating means to transmit motion therebetween adapted to move the shift valve to its several drive ratio activating positions, detent means to anchor the shift valve in the several drive ratio activating positions, a source of pressure fluid responsive to the forward speed of the vehicle, a cylinder connected to said source of pressurized fluid, and a piston-type blocker reciprocably mounted in said cylinder for movement by the pressurized fluid therein, said blocker being arranged to have portions thereof engageable with portions of said mechanism and arranged to be moved into positions blocking the movement of the shift valve to a reverse drive activating position whenever the forward vehicle speed is above a predetermined value while permitting shift of said shift valve to the other drive ratio activating positions at all forward vehicle speeds.

5. In a multispeed motor vehicle transmission having operating means for driver selection of several forward drive ratios and a neutral and a reverse drive ratio, a pressure fluid operated control system for said transmission including a shiftable drive ratio selector mechanism including a valve movable to different positions to selectively activate the several drive ratios, a shiftable lever connected to said shift valve and operable to effect shift thereof, linkage means connected between the lever and the transmission operating means to transmit motion therebetween adapted to move the shift valve to its several drive ratio activating positions, detent means to anchor the shift valve in the several drive ratio activating positions, a source of pressure fluid responsive to the forward speed of the vehicle, a cylinder connected to said source of pressurized fluid, and a piston-type blocker reciprocably mounted in said cylinder for movement by the pressurized fluid therein, said blocker being arranged to have portions thereof engageable with portions of said mechanism and arranged to be moved into positions blocking shift of said shift valve to a position activating the reverse drive ratio whenever the forward vehicle speed is above a predetermined value but permitting shift of said shift valve to the other drive ratio activating positions at all forward vehicle speeds.

References Cited in the file of this patent

UNITED STATES PATENTS

| | | |
|---|---|---|
| 2,115,097 | Durham | Apr. 26, 1938 |
| 2,516,203 | Greenlee et al. | July 25, 1950 |
| 2,528,584 | Farkas | Nov. 7, 1950 |
| 2,633,760 | Kelley | Apr. 7, 1953 |
| 2,670,064 | Hasbany | Feb. 23, 1954 |
| 2,697,363 | Sheppard | Dec. 21, 1954 |

UNITED STATES PATENT OFFICE

CERTIFICATE OF CORRECTION

Patent No. 2,924,124                         February 9, 1960

Leonard E. Froslie

It is hereby certified that error appears in the printed specification of the above numbered patent requiring correction and that the said Letters Patent should read as corrected below.

Column 4, line 44, after "provides" insert -- for --; column 8, line 33, for "therein" read -- applied thereto --.

Signed and sealed this 9th day of August 1960

(SEAL)
Attest:

KARL H. AXLINE
Attesting Officer

ROBERT C. WATSON
Commissioner of Patents